Nov. 11, 1958 — L. A. CUMMARO — 2,859,782
HY-TORQUE DRIVE TOOL
Filed July 1, 1955 — 2 Sheets-Sheet 1
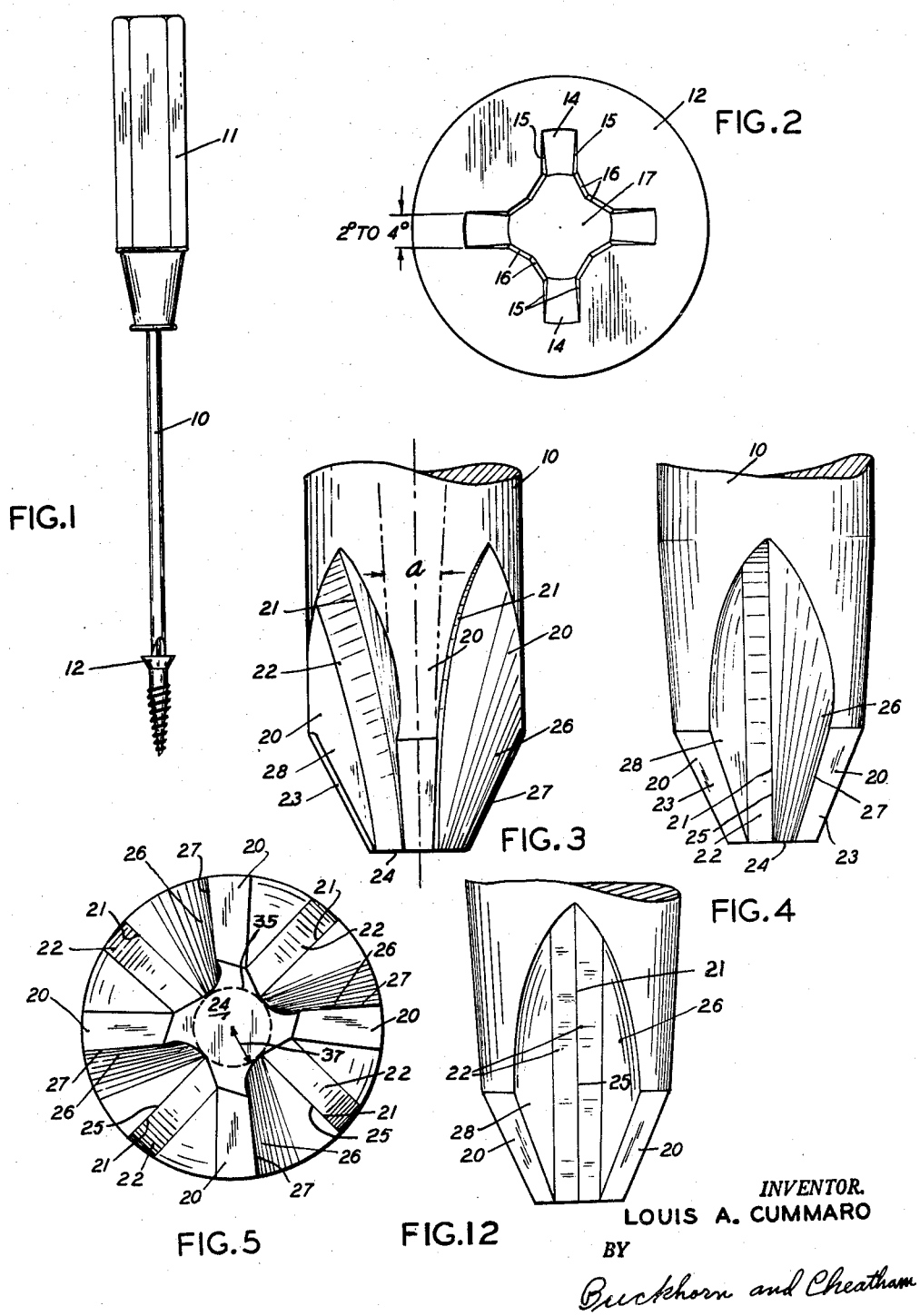
INVENTOR.
LOUIS A. CUMMARO
BY
Buckhorn and Cheatham
ATTORNEYS Nov. 11, 1958
L. A. CUMMARO
2,859,782
HY-TORQUE DRIVE TOOL
Filed July 1, 1955
2 Sheets-Sheet 2
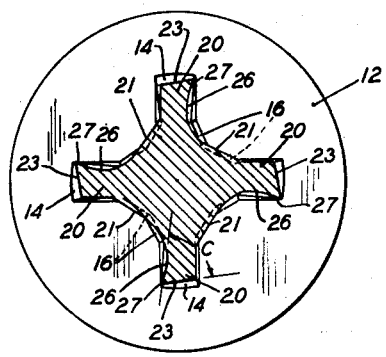
FIG. 6
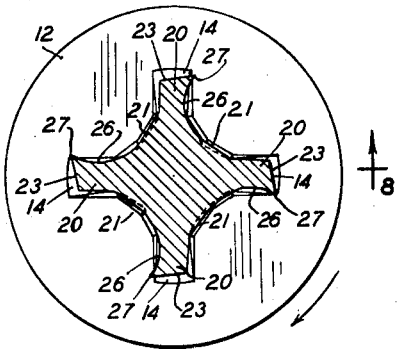
FIG. 7
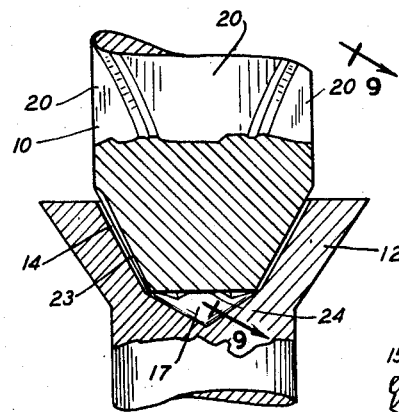
FIG. 8
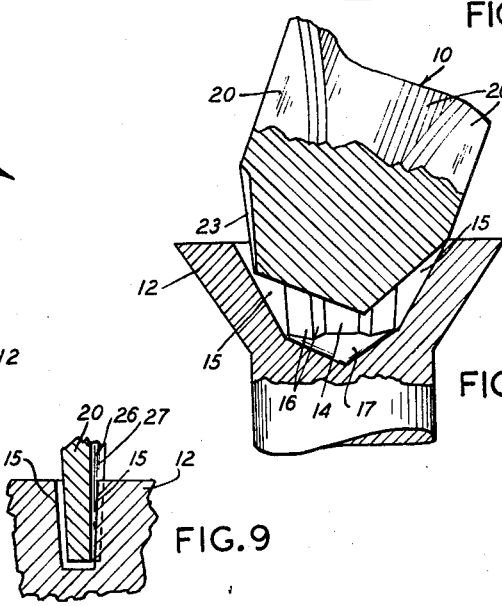
FIG. 9
FIG. 10
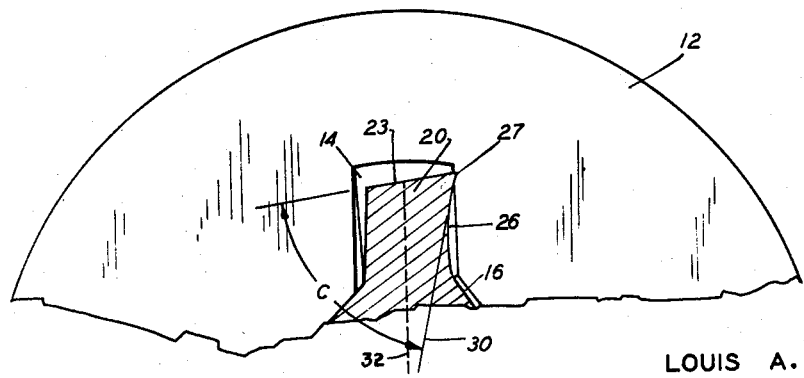
FIG. 11
INVENTOR.
LOUIS A. CUMMARO
BY
Buckhorn and Cheatham
ATTORNEYS

United States Patent Office 2,859,782
Patented Nov. 11, 1958

2,859,782

HY-TORQUE DRIVE TOOL

Louis A. Cummaro, Bronxville, N. Y., assignor to Phillips Screw Company, New York, N. Y., a corporation of Delaware Application July 1, 1955, Serial No. 519,507

2 Claims. (Cl. 145—50)

The present invention relates to screw drivers and more particularly to a new and improved construction of screw driver bits for use with screws and like fastening devices provided with driving recesses of the cruciform type.

As is well known, the driver engaging face or side walls of a cruciform type screw recess converge inwardly of the recess at a slight angle and because of this slight angle of inclination, an outward axial thrust component is produced when the screw is driven and which tends to force the conventional driver out of the screw recess. This outward axial thrust, usually referred to as "throw-out" interferes with the application of a heavy driving torque, such as may be required, for example, in the case of self-tapping screws to be driven into untapped holes in thick metal. In such instances the operator is required to exert considerable force on the driver to retain it in engagement with the screw which is tiring, and if not properly done the recess is reamed out.

A further disadvantage inherent in the design of conventional drivers for cruciform recesses is that it is necessary to retain the driver and screw in axial alignment during the driving operation to drive the screw effectively. In many instances, of course, it is not possible to align the screw and driver and in assembly line operations, the driver operators are frequently careless in holding the driver in alignment with the screw with the result that the screw is not seated as firmly as it should be, or the screw recess is burred or reamed out during the driving operation because of the "off angle" between the screw and driver.

It is the principal object of the present invention to provide a new and improved screw driver which will facilitate driving recessed head screws.

More particularly, it is an object of the invention to provide a driver to facilitate the driving of recessed head screws at a high torque value with negligible throw-out thrust.

Another specific object of the invention is to provide a driver for recessed head screws in which the normal throw-out effect of the angularly inclined driver engaging faces is neutralized.

A further object of the invention is to provide a driver which will permit off angle driving of recessed head screws without damage to the recess.

Still another object of the invention is to provide a driver of such design that tolerance requirements in the formation of the screw recess and in the manufacture of the driver are such as to permit economical manufacture of the screw and driver.

Other objects and advantages of the invention will become more apparent hereinafter.

In accordance with the illustrated embodiment of the present invention there is provided a screw driver comprising a bit portion having alternate vanes and flutes adapted to fit cooperatively into a complementary, polygonal screw recess. The driving face of each of the vanes is formed with a reverse angular slope while the outer edge, which is of conventional angular taper, is sharpened so that it tends to gouge or bite into the adjacent rib of the screw recess to retain the bit in engagement with the screw during driving thereof.

For a more detailed description of the invention, reference is made to the accompanying drawings, wherein:

Fig. 1 illustrates a screw driver constructed in accordance with the present invention in engagement with a recessed head screw;

Fig. 2 is a plan view of the head of a screw provided with a recess of the type with which a screw driver made in accordance with the present invention is adapted to cooperate;

Fig. 3 is a fragmentary elevation of a screw driver bit portion made in accordance with the present invention;

Fig. 4 is a fragmentary elevation of the screw driver bit portion rotated 90 degrees from its position in Fig. 3;

Fig. 5 is an end view of the bit portion of the driver of the invention;

Fig. 6 is a sectional view showing the driver bit positioned in a screw recess prior to driving the screw, the section being taken through the bit substantially along the plane of the screw head;

Fig. 7 is a sectional view similar to Fig. 6 showing the relative position of the driver and screw when the screw is being driven;

Fig. 8 is a vertical axial section substantially on line 8—8 of Fig. 7;

Fig. 9 is a sectional view taken along line 9—9 of Fig. 8;

Fig. 10 is a view similar to Fig. 8 showing the driver positioned at an off angle of approximately 20 degrees with respect to the axis of the screw;

Fig. 11 is an enlarged sectional view of a bit vane in the plane of the screw head; and Fig. 12 is a fragmentary elevation of a conventional screw driven bit portion.

Referring now to the drawings, Fig. 1 shows a more or less conventional screw driver comprising a shank portion 10 securely fastened at one end to a handle 11. The opposite end of the shank portion 10 is formed with a cruciform bit adapted to fit cooperatively within a cruciform recess formed in the head of a wood screw 12. For purposes of simplicity, the present invention will be described and shown in connection with a so called flat headed wood screw although it will be obvious that the invention is equally applicable to any screws or like fastening devices having a polygonal recess as herein shown and all such devices should be considered as falling within the definition of the term "screw" as used in the present specification and the following claims.

For purposes of illustration the invention is shown as applied to a driver for driving screws having a cruciform recess formed as shown in the Tomalis Patents 2,474,994 and 2,507,231 since such screws are more or less standard in the industry today. Such a screw recess is shown in detail in Fig. 2. The recess comprises a plurality of radially extending slots or grooves defined by the outer end walls 14 which are inclined inwardly toward the axis of the recess and by opposite side walls 15, the opposite side walls of each pair of adjacent slots merging with a pair of intermediate angular contiguous wall portions 16. The opposite slot side walls 15 diverge from each other from their outermost portions in the direction inwardly toward the axis of the recess and also taper inwardly of the recess towards each other where they meet with the outer walls 14 towards the bottom of the recess. The intermediate wall portions 16 also taper inwardly toward the axis of the recess at the lower end thereof. The bottom 17 of the recess is bluntly concave as may be seen in Figs. 8 and 10.

As indiciated in the Tomalis patents, the screw recess is formed so that the intersections of the walls 15 of the recess slot with a plane at right angles to the axis of the screw or with the surface of the head of a flat headed screw include an angle of between 2 and 4 degrees as may be seen in Fig. 2. This angle is conveniently referred to as a "horizontal" angle. Also, the side walls 15 of the recess slots preferably converge whereby the intersection of such walls with a plane parallel to the axis of the bit and transverse to the wing define an included "vertical" angle of about 8 to 10 degrees. For any further details in connection with the preferred configuration of the recess, reference is made to the Tomalis patents, supra.

The bit portion of the conventional screw driver 10 shown in Fig. 12 is formed substantially complementary to the recess in which it will be received and comprises a plurality of wings or vanes 20 equal in number and spacing to the slots in the screw head recess. Intermediate the vanes 20 are concave channels or flutes 21. As explained in the Tomalis patents, supra, the side walls or faces of the bit vanes 20 of a conventional driver which correspond to and cooperate with the side walls 15 of the recessed slots may be substantially parallel to one another but are preferably formed to the exact angular disposition of the slot walls 15 in both the vertical and horizontal plane. The flutes 21 are each formed with a pair of walls 22 complementary to the rib walls 16 of the screw recess and meeting along the center line 25 of the flute. It will be apparent that a corresponding face of each of the vanes will constitute a driving face depending upon whether the screw is being inserted or removed. In the interest of simplicity and clarity, in the present specification the term "driving face" is used with particular reference to the side of the vane which engages the screw when the driver is used to insert a screw and is indicated in the drawings by the numeral 26. The opposite face 28 will be termed the "removal" face.

While the various portions of the driver bit and recess are formed with the same relative angular disposition, the breadth of the bit portion in any plane at right angles to the axis thereof as measured between diametrically opposite flute walls 22 is preferably slightly greater in proportion to the width of the recess between corresponding points so that upon introducing the driver into the screw recess, a wedging action takes place on the side walls 16 and flute walls 22 to hold the driver and screw engaged sufficiently tightly to facilitate insertion of the screw in a work piece.

Referring now particularly to Fig. 11, in accordance with the present invention a sharp driving edge 27 is formed on the outer edge of the driving face 26 of each bit vane by concavely recessing the driving face of the vane, as by hollow grinding or milling, the recess extending to the center line 25 of the adjacent flute as most clearly shown in Figs. 4 and 5. For purposes of illustration, the concavity has been somewhat exaggerated in the drawings.

As best shown in Fig. 11, the bit vanes are asymmetrical with respect to radii 32 of the bit intersecting the end walls 23 midway between the opposite side edges or faces thereof, the vanes being of greater thickness and having a greater mass between such radii and the removal faces 28 than between the radii 32 and the driving faces 26. In the illustrated embodiment, the radii 32 lie in the radial planes which bisect the end walls 23. As apparent in Fig. 11, the outer portion of each of the driving faces 26 converges toward the radii 32 inwardly of the bit, any point in such portion lying substantially along a radius of the bit. The vanes should be of at least uniform thickness and preferably of increasing thickness from the end walls 23 inwardly of the bit so that they will have sufficient strength to resist the driving torque. In the illustrated embodiment, the removal faces 28 of the vanes diverge from the radii 32 so as to maintain the outer part of the vane at substantially uniform thickness and the inner part of progressively increasing thickness.

As best observed in Fig. 11, the curved configuration of the driving face 26 causes an intermediate portion of the face, for example, that portion of the face adjacent the lead line in Fig. 11 of numeral 26, to be positioned closer to the radii 32 than the edge of the driving face and to be at least as close as to the radii 32 as portions of the face spaced further inwardly toward the bit axis. The sharpness of the edge 27 may be accentuated by relieving the outer bit wall 23 of a vane to incline the same inwardly of the bit from the driving edge as most clearly shown in Figs. 6 and 11. Preferably the bit wall 23 is inclined so that the wall and a line 30 normal to the bit axis and intersecting the driving edge 27 define an included angle $c$ of about 87 degrees as shown in Fig. 11. And preferably the edge 27 and removal face 28 of a vane taper substantially at the conventional "vertical" angle of 8 to 10 degrees, as indicated at $a$ in Fig. 3.

To describe the bit of the invention in a somewhat different way, it will be noted that the vanes 20 project radially from a central core which may be defined as that portion of the bit circumscribed by a generally cylindrical body having points of tangency with the center line 25 of each of the flutes, the outline of this core being shown by the dotted line 35 in Fig. 5. The center or base portion of the flutes 21 adjacent the free end of the bit lie substantially along the periphery of the core and are substantially parallel to the bit axis. As will be seen from a comparison of Figs. 3 and 5, a major portion of each vane 20 projects from the core by a distance not substantially less than the radius, indicated at 37 in Fig. 5, of the core. Also, as may be seen most clearly in Fig. 3, the height of each vane 20 increases progressively in the direction away from the free end of the bit over the effective fastener engaging portion of the bit.

The driver of the invention is also preferably formed with a flat end 24 extending at right angles to the bit axis and is preferably so proportioned that the end of the bit is spaced above the bottom of the recess when the driver is initially engaged in the screw recess as shown in Fig. 8, so that further penetrative movement of the driver may occur during the driving of the screw if a relaxation occurs of certain portions of the screw or bit whereby firm engagement will be maintained.

The action of such a driver upon the application of driving torque is indicated in views of Figs. 7, 9 and 11 where it will be seen that the edge 27 penetrates or bites into the opposing recess side wall 15. As apparent, the recessing or relief of the driving faces 26 facilitates the rotation of the driver to the position shown in Figs. 7 and 11. Inasmuch as the driving edge 27 extends obliquely with respect to the axis of the bit, it is evident that outward axial movement of the bit during the driving operation will be substantially precluded. It will be seen that the complementary inclination of the driving edge 27 and recess slot side wall 15 is preferred whereby the edge will engage the wall 15 substantially throughout their cooperating height.

A driver made in accordance with the present embodiment of the invention requires less than 5% as much axial thrust load to retain the driver in engagement with the screw during driving thereof as compared with heretofore conventional drivers.

A further important advantage of the driver of the invention is that a screw may be driven even though the axis of the bit is disposed at a considerable angle with respect to the axis of the screw. For example, even with the bit positioned at an off angle of 20 degrees as depicted in Fig. 10, screws may be firmly seated in the work piece into which they are driven without damage to the screw recess. This is an important feature for there are many instances where it is impossible to align a driving tool such as a power driver with the axis of the screw and heretofore recessed head screws were driven home in such instances only with great difficulty or could not be used at all and other more expensive fastening devices were necessary.

Another advantage resulting from the use of drivers made in accordance with the invention is that the screws may be manufactured with greater allowable tolerance variations in the recess which heretofore have had to be formed to very close tolerances. Moreover, screws driven with the bit of the invention may be more firmly seated and the operator of the driver is relieved of the necessity of applying a relatively great force to the driver to retain the bit in engagement with the screw and of maintaining the driver in exact axial alignment with the screw.

Having illustrated and described preferred embodiments of the invention, it should be apparent to those skilled in the art that the invention permits of modifications in arrangement and detail. I claim as my invention all such modifications as come within the true spirit and scope of the appended claims.

I claim:

1. A tool having a driving bit at its forward end of generally cruciform cross sectional configuration for engaging in a preformed recess in a fastener, the recess having generally radial slots defined by opposed side walls and an end wall inclined inwardly toward the bottom of the recess, said bit being defined by a central core and a plurality of alternate vanes protruding from the core and concave flutes having a base portion lying along the periphery of the core adjacent the free end of the bit, each of said vanes having an outer end wall, a driving face and a removal face opposite said driving face, each of said vanes projecting generally radially outwardly from the core, the end wall of each vane diverging from said core in the direction away from the free end of the bit so that the height of the vane at a point spaced from the free end of the bit is greater than at said free end, a major portion of each vane projecting from said core by a distance not substantially less than the radius of the core, each of said vanes being asymmetrical with respect to radii medially intersecting the end wall thereof, each of said vanes being of greater thickness between said radii and said removal face than between said radii and said driving face, an intermediate portion of each driving face lying closer to said radii than does the edge of such driving face and being at least as close to such radii as portions inwardly of such intermediate portion, any point on that portion of each driving face adjacent the end wall of the corresponding vane lying substantially along a radius of the bit, said last-mentioned face portion converging toward said radii in the direction extending inwardly toward the bit axis.

2. A driving tool having a driving bit at its forward end of generally cruciform cross sectional configuration for engaging in a preformed recess in a fastener, the recess having generally radial slots defined by opposed side walls and an end wall inclined inwardly toward the bottom of the recess, said bit being defined by a plurality of alternate protruding vanes and concave flutes, said flutes each having a bottom surface lying between the vanes, the portion of said flute bottom surfaces adjacent the free end of the bit and adapted to engage within said fastener recess extending generally axially of the bit, said vanes each having a driving face, an opposite removal face and an outer end wall, said outer end walls diverging from the axis of the bit in the direction away from the free end of the bit whereby the driving faces of said vanes are of progressively greater height in the direction away from the free end of the bit over the effective fastener engaging portion of the bit, each of said vanes being asymmetrical with respect to radii medially intersecting the end wall thereof, said vanes being thicker in the portion between said radii and said removal faces than on the opposite side of said radii, a part of each driving face inwardly of the end wall of the corresponding vane being concave and any point on that portion of each driving face adjacent said end wall of the corresponding vane lying substantially along a radius of the bit, said last-mentioned face portion converging toward said radii in the direction extending inwardly toward the bit axis.

References Cited in the file of this patent

UNITED STATES PATENTS

| | | |
|---|---|---|
| 839,105 | Butler | Dec. 25, 1906 |
| 1,105,535 | Roberts | July 28, 1914 |
| 1,448,392 | Earnshaw | Mar. 13, 1923 |
| 1,875,484 | Nigra | Sept. 6, 1932 |
| 1,908,081 | Thompson | May 9, 1933 |
| 2,046,837 | Philips | July 7, 1936 |
| 2,244,824 | Caminey | June 10, 1941 |
| 2,445,525 | Gulden | July 20, 1948 |
| 2,601,453 | Phipard | June 24, 1952 |